(12) United States Patent
Walker, Jr.

(10) Patent No.: US 8,032,188 B1
(45) Date of Patent: Oct. 4, 2011

(54) CELLULAR PHONE APPARATUS

(76) Inventor: James R. Walker, Jr., Mashpee, MA (US)

( * ) Notice: Subject to any disclaimer, the term of this patent is extended or adjusted under 35 U.S.C. 154(b) by 336 days.

(21) Appl. No.: 12/328,175

(22) Filed: Dec. 4, 2008

(51) Int. Cl.
*H04B 1/38* (2006.01)

(52) U.S. Cl. ... 455/573; 455/401; 455/567; 379/433.08; 379/433.02

(58) Field of Classification Search .................. 455/573, 455/401, 426, 426.1, 462–465, 74.1, 567; 379/65, 61
See application file for complete search history.

(56) References Cited

U.S. PATENT DOCUMENTS

| | | | |
|---|---|---|---|
| 5,659,236 A * | 8/1997 | Hahn | 320/111 |
| 5,712,619 A * | 1/1998 | Simkin | 340/539.13 |
| 6,035,221 A | 3/2000 | Snyder et al. | |
| 6,226,536 B1 * | 5/2001 | Miyashita | 455/567 |
| 6,766,175 B2 | 7/2004 | Uchiyama | |
| D512,704 S | 12/2005 | Ron | |
| 7,010,311 B2 | 3/2006 | Liu | |
| 7,324,834 B2 | 1/2008 | Yamaguchi et al. | |
| 2001/0024966 A1 | 9/2001 | Miller et al. | |
| 2003/0162574 A1 * | 8/2003 | Fan | 455/573 |
| 2004/0132501 A1 * | 7/2004 | Jiang | 455/573 |
| 2004/0204179 A1 * | 10/2004 | Hsu | 455/573 |
| 2006/0174754 A1 * | 8/2006 | Yamada | 84/723 |
| 2006/0291640 A1 * | 12/2006 | Nagesh et al. | 379/211.02 |

\* cited by examiner

*Primary Examiner* — Matthew Sams
*Assistant Examiner* — Marisol Fahnert
(74) *Attorney, Agent, or Firm* — Crossley Patent Law; Mark A. Crossley

(57) ABSTRACT

A cellular phone apparatus that is designed to mount at least one cellular phone and also alert an individual when any one of the cellular phones mounted within the apparatus receives a call. One embodiment of the apparatus can hold one cellular phones, while another embodiment of the apparatus can hold three cellular phones. The phones are preferably placed into "vibrate" mode when being placed within the apparatus. When a phone mounted within the apparatus receives a call, the vibration of that cellular phone will activate the apparatus, causing the apparatus to make a ringing sound and alert an individual of the incoming call.

9 Claims, 4 Drawing Sheets

CELLULAR PHONE APPARATUS

BACKGROUND OF THE INVENTION

The present invention concerns that of a new and improved cellular phone apparatus that is designed to mount at least one cellular phone and also alert an individual when any one of the cellular phones mounted within the apparatus receives a call.

SUMMARY OF THE INVENTION

The present invention concerns that of a new and improved cellular phone apparatus that is designed to mount at least one cellular phone and also alert an individual when any one of the cellular phones mounted within the apparatus receives a call. One embodiment of the apparatus can hold one cellular phones, while another embodiment of the apparatus can hold three cellular phones. The phones are preferably placed into "vibrate" mode when being placed within the apparatus. When a phone mounted within the apparatus receives a call, the vibration of that cellular phone will activate the apparatus, causing the apparatus to make a ringing sound and alert an individual of the incoming call.

There has thus been outlined, rather broadly, the more important features of a cellular phone apparatus that the detailed description thereof that follows may be better understood and in order that the present contribution to the art may be better appreciated. There are, of course, additional features of the cellular phone apparatus that will be described hereinafter and which will form the subject matter of the claims appended hereto.

In this respect, before explaining at least one embodiment of the cellular phone apparatus in detail, it is to be understood that the cellular phone apparatus is not limited in its application to the details of construction and to the arrangements of the components set forth in the following description or illustrated in the drawings. The cellular phone apparatus is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present cellular phone apparatus. It is important, therefore, that the claims be regarded as including such equivalent constructions insofar as they do not depart from the spirit and scope of the present invention.

It is therefore an object of the present invention to provide a cellular phone apparatus which has all of the advantages of the prior art and none of the disadvantages.

It is another object of the present invention to provide a cellular phone apparatus which may be easily and efficiently manufactured and marketed.

It is another object of the present invention to provide a cellular phone apparatus which is of durable and reliable construction.

It is yet another object of the present invention to provide a cellular phone apparatus which is economically affordable and available for relevant market segment of the purchasing public.

Other objects, features and advantages of the present invention will become more readily apparent from the following detailed description of the preferred embodiment when considered with the attached drawings and appended claims.

DESCRIPTION OF THE PREFERRED EMBODIMENT

Figure 1:
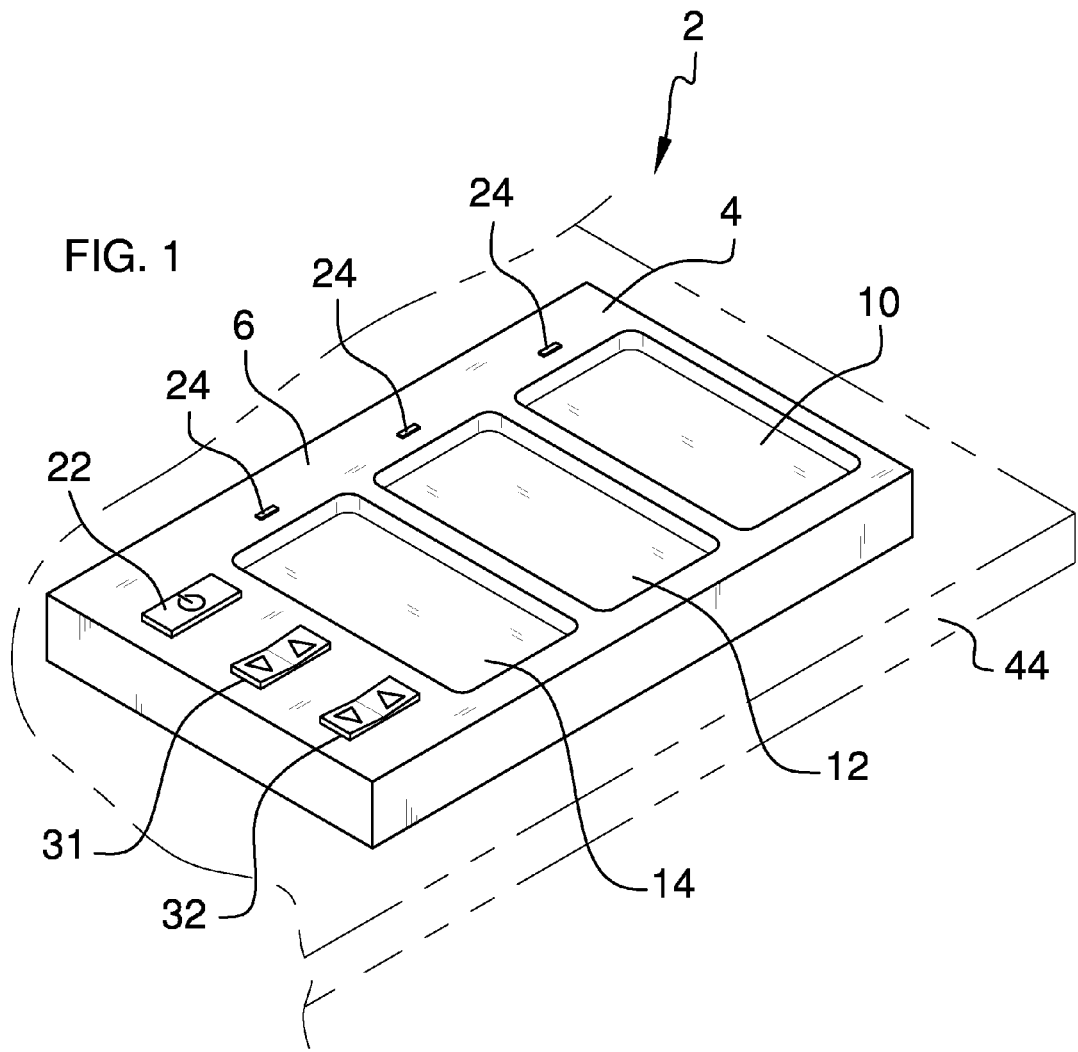
FIG. 1 shows a top perspective view of the three-phone version of the cellular phone apparatus.
Figure 2:
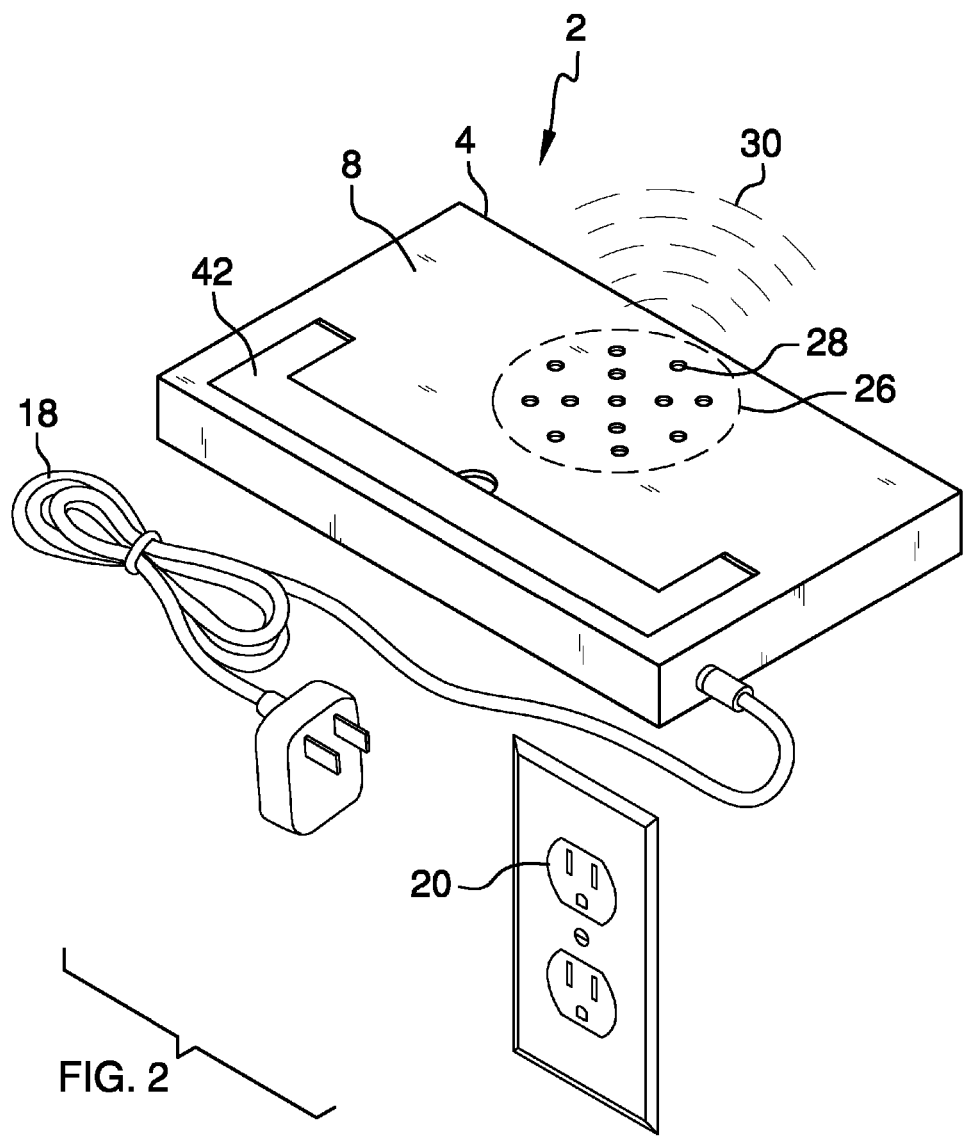
FIG. 2 shows a bottom perspective view of the three-phone version of the cellular phone apparatus.
Figure 3:
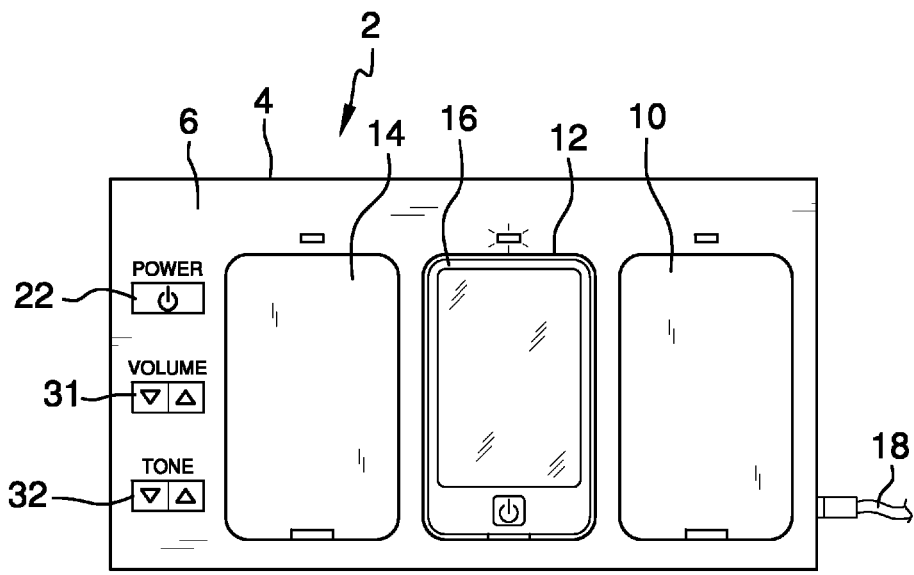
FIG. 3 shows a top view of the three-phone version of the cellular phone apparatus.

With reference now to the drawings, and in particular to FIGS. 1 through 6 thereof, a cellular phone apparatus embodying the principles and concepts of the present invention and generally designated by the reference numeral 2 will be described.

As best illustrated in FIGS. 1 through 6, the cellular phone apparatus 2 comprises an outer casing 4 that has two surfaces comprising an upper surface 6 and a lower surface 8. The preferred embodiment, shown in FIGS. 1-3, has three cradles 10, 12, 14 in which to mount a cellular phone 16, with each of these mounts being located on the upper surface 6 of the outer casing 4.

The outer casing 4 of the apparatus 2 in the preferred embodiment receives its power through a power connection 18 that preferably hooks up to a standard outlet 20. A power button 22 located on the upper surface 6 of the outer casing 4 serves as an on/off switch in between the power connection 18 and the various components within the apparatus 2.

When a cellular phone 16 is placed into any one of the cradles, each such cellular phone begins to be charged. Each cradle has an adjacent charging LED indicator 24 that will lighten up to indicate the ongoing charging process of a cellular phone that has been placed within the respective cradle.

The apparatus 2 also has a speaker 26 within the outer casing 4, with the speaker 26 capable of being heard through a plurality of holes 28 that are on the lower surface 8 of the outer casing 4. The speaker 26 is capable of emitting ringing tones 30, with these ringing tones capable of being chosen or controlled by control buttons 31 and 32 located on the upper surface 6 of the outer casing 4. The speaker 26 is located within the outer casing 4 immediately adjacent to the plurality of holes 28.

The control buttons 31 and 32, along with the speaker 26 and the power connection 18, are connected to a central processing unit (CPU) 34 within the outer casing 4. The CPU 34 has the various tones 30 stored, and is also connected to a transmitter 36 that will transmit signals 38 that are picked up by receivers 40 in the attached cellular phones 16.

The preferred embodiment of the apparatus 2 also has a retractable stand 42 which is attached to the lower surface 8 of the outer casing 4. The stand 42 will allow the outer casing 4 to be placed in an upright position in relation to a flat surface 44.

Figure 4:
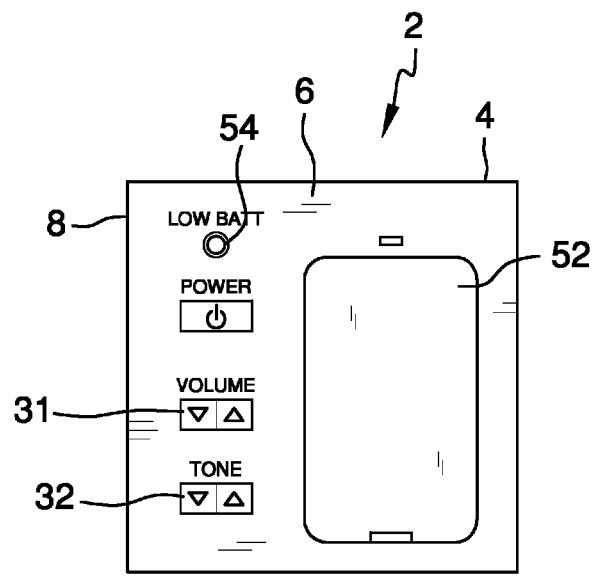
FIG. 4 shows a top view of the one-phone version of the cellular phone apparatus.
Figure 5:
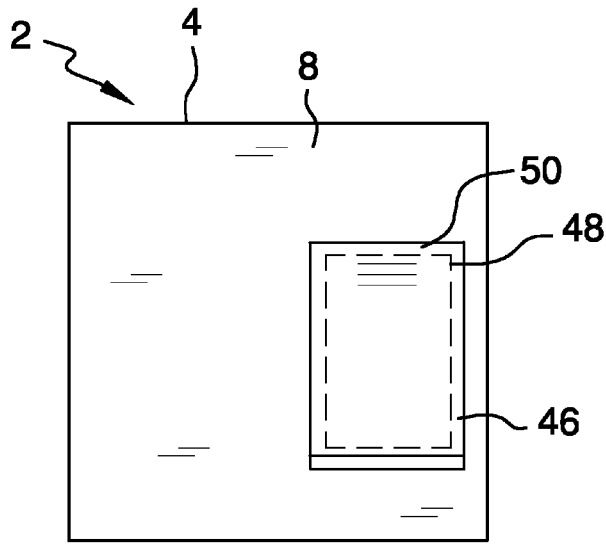
FIG. 5 shows a bottom view of the one-phone version of the cellular phone apparatus.
Figure 6:
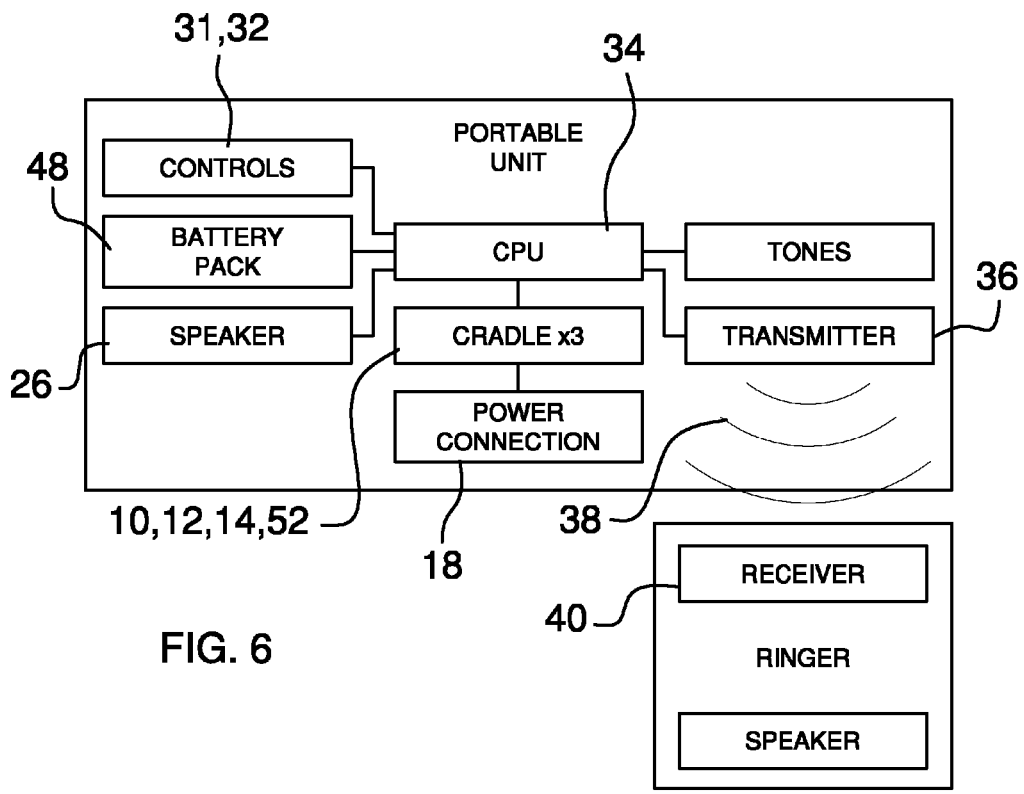
FIG. 6 shows an electrical schematic of the various components within each version of the cellular phone apparatus.

The alternative embodiment of the apparatus 2, shown in FIGS. 4 and 5, has a battery compartment 46 that includes at least one battery 48. The compartment 46 is covered by a battery lid cover 50. Furthermore, this embodiment only includes one cradle 52 rather than three cradles, as is present in the preferred embodiment. The battery 48 located within the battery compartment 46 charges each cellular phone 16 that is mounted within a cradle 52. The battery 48 is connected to the CPU 34, the speaker 26, and other various components within the outer casing 4.

The upper surface 6 of the outer casing 4 of the alternative embodiment of the apparatus 2 also includes a low battery light 54. This light 54 is connected to the batteries that are included with this embodiment and will light up when the batteries have little power left, allowing an individual to change the batteries while there is still power within the unit.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What I claim as my invention is:

1. A cellular phone apparatus comprising
an outer casing, the outer casing having two surfaces comprising an upper surface and a lower surface,
means for mounting a cellular phone on the outer casing,
means for charging each cellular phone mounted on the outer casing,
means for emitting sounds when a cellular phone mounted on the outer casing receives a telephone call,
wherein the means for mounting a cellular phone on the outer casing further comprises
at least one cradle mounted on the upper surface of the outer casing,
wherein the cradle is mounted on the upper surface of the outer casing,
wherein the means for charging each cellular phone mounted on the outer casing further comprises
a battery compartment located within the outer casing,
at least one battery located within the battery compartment,
a battery lid cover located over the battery located within the battery compartment,
wherein the battery helps to charge a cellular telephone mounted within the cradle,
wherein the means for emitting sounds when a cellular phone mounted on the outer casing receives a telephone call further comprises
a central processing unit located within the outer casing, the central processing unit being connected to the battery,
a speaker located within the outer casing, the speaker being connected to the battery, the speaker also being connected to the central processing unit,
means for having the speaker emit sounds through the outer casing,
wherein the means for having the speaker emit sounds through the outer casing further comprises
a plurality of holes in the outer casing,
wherein the plurality of holes are located in the lower surface of the outer casing adjacent to the location of the speaker,
wherein the sounds emitted through the speaker and the plurality of holes comprises a series of ringing tones,
wherein the apparatus further comprises
a low battery light indicator,
wherein the low battery light indicator is attached to the upper surface of the outer casing,
further wherein the low battery light indicator is connected to the battery located within the battery compartment.

2. A cellular phone apparatus according to claim 1 wherein the means for charging each cellular phone mounted on the outer casing further comprises
(a) a power connection attached to the outer casing, wherein the power connection is connected to standard household current,
(b) means for controlling the flow of power from the power connection to various components within the outer casing.

3. A cellular phone apparatus according to claim 2 wherein the means for controlling the flow of power from the power connection to various components within the outer casing further comprises
(a) a power button,
(b) wherein the power button is located on the upper surface of the outer casing,
(c) further wherein the power button serves as an on/off switch in between the power connection and the various components within the outer casing.

4. A cellular phone apparatus according to claim 3 wherein the means for emitting sounds when a cellular phone mounted on the outer casing receives a telephone call further comprises
(a) a central processing unit located within the outer casing, the central processing unit being connected to the battery,
(b) a speaker located within the outer casing, the speaker being connected to the battery, the speaker also being connected to the central processing unit, and
(c) means for having the speaker emit sounds through the outer casing.

5. A cellular phone apparatus according to claim 4 wherein the apparatus further comprises
(a) a pair of control buttons comprising a first control button and a second control button,
(b) wherein the pair of control buttons are mounted on the upper surface of the outer casing,
(c) further wherein the pair of control buttons are connected to the central processing unit.

6. A cellular phone apparatus according to claim 5 wherein the means for emitting sounds when a cellular phone mounted on the outer casing receives a telephone call further comprises
(a) a transmitter located within the outer casing,
(b) a receiver located within each cellular phone mounted within the outer casing,
(c) wherein the transmitter sends signals that are then picked up by a receiver.

7. A cellular phone apparatus according to claim 6 wherein the apparatus further comprises
(a) a retractable stand,
(b) wherein the retractable stand is attached to the lower surface of the outer casing.

8. A cellular phone apparatus comprising
(a) an outer casing, the outer casing having two surfaces comprising an upper surface and a lower surface,
(b) means for mounting a cellular phone on the outer casing, said means further comprising (i) at least three cradles mounted on the upper surface of the outer casing, (ii) wherein the cradle is mounted on the upper surface of the outer casing,
(c) means for charging each cellular phone mounted on the outer casing, said means further comprising (i) a battery compartment located within the outer casing, (ii) at least one battery located within the battery compartment, (iii) a battery lid cover located over the battery located within the battery compartment, (iv) wherein the battery helps to charge a cellular telephone mounted within the cradle, and
(d) means for emitting sounds when a cellular phone mounted on the outer casing receives a telephone call, said means further comprising (i) a central processing unit located within the outer casing, the central processing unit being connected to the battery, (ii) a speaker located within the outer casing, the speaker being connected to the battery, the speaker also being connected to the central processing unit, (iii) means for having the speaker emit sounds through the outer casing, said sounds comprising a series of ringing tones, said means further comprising (1) a plurality of holes in the outer casing, (2) wherein the plurality of holes are located in the lower surface of the outer casing adjacent to the location of the speaker, and
(e) a low battery light indicator, wherein the low battery light indicator is attached to the upper surface of the outer casing, further wherein the low battery light indicator is connected to the battery located within the battery compartment.

9. A cellular phone apparatus comprising
(a) an outer casing, the outer casing having two surfaces comprising an upper surface and a lower surface,
(b) means for mounting a cellular phone on the outer casing, said means further comprising (i) three cradles, (ii) wherein each cradle is mounted on the upper surface of the outer casing,
(c) means for charging each cellular phone mounted on the outer casing, said means further comprising (i) a power connection attached to the outer casing, wherein the power connection is connected to standard household current, (ii) means for controlling the flow of power from the power connection to various components within the outer casing, said means further comprising (1) a power button, (2) wherein the power button is located on the upper surface of the outer casing, (3) further wherein the power button serves as an on/off switch in between the power connection and the various components within the outer casing, and
(d) means for emitting sounds when a cellular phone mounted on the outer casing receives a telephone call, said means further comprising (i) a central processing unit located within the outer casing, the central processing unit being connected to a battery, (ii) a speaker located within the outer casing, the speaker being connected to the battery, the speaker also being connected to the central processing unit, and (iii) means for having the speaker emit sounds through the outer casing, said means further comprising (1) a transmitter located within the outer casing, (2) a receiver located within each cellular phone mounted within the outer casing, (3) wherein the transmitter sends signals that are then picked up by a receiver,
(e) a pair of control buttons comprising a first control button and a second control button, wherein the pair of control buttons are mounted on the upper surface of the outer casing, further wherein the pair of control buttons are connected to the central processing unit,
(f) a retractable stand, wherein the retractable stand is attached to the lower surface of the outer casing.

* * * * *